W. A. BRICE.
PHOTOGRAPHIC TESTING-PLATE FOR CAMERAS.
No. 182,099. Patented Sept. 12, 1876.
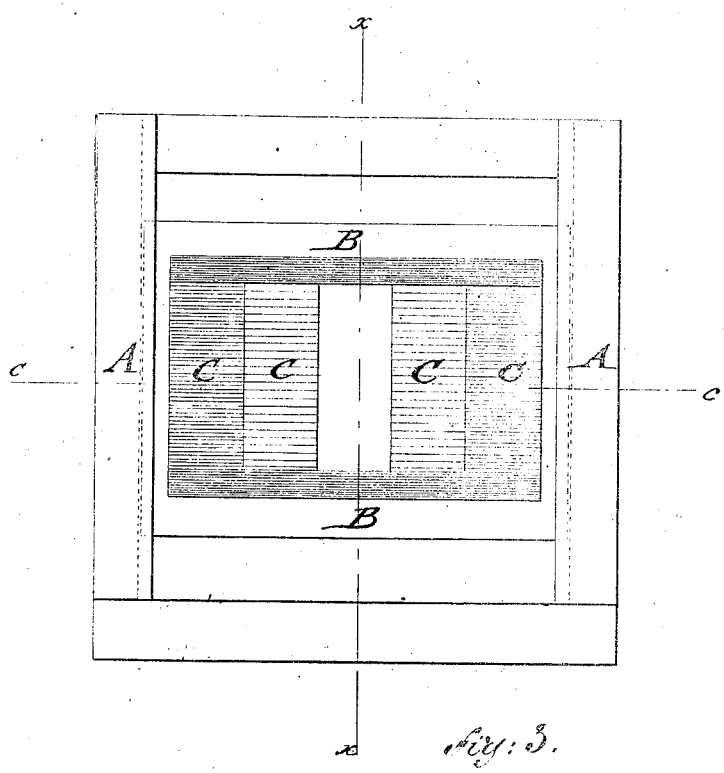
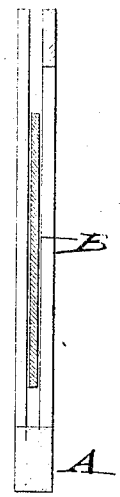
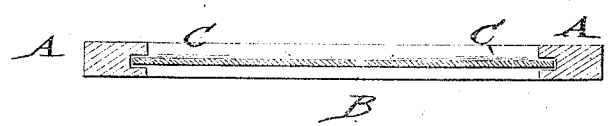
WITNESSES:
Chas. Nida
John Goethals
INVENTOR:
Wm. A. Brice
BY
Munn
ATTORNEYS.

UNITED STATES PATENT OFFICE.

WILLIAM A. BRICE, OF LONDON, ENGLAND.

IMPROVEMENT IN PHOTOGRAPHIC TESTING-PLATES FOR CAMERAS.

Specification forming part of Letters Patent No. 182,099, dated September 12, 1876; application filed May 1, 1876.

*To all whom it may concern:*

Be it known that I, WILLIAM A. BRICE, of London, England, have invented a new and Improved Photographic Testing-Plate or Actinometer, of which the following is a specification:

In the accompanying drawing, Figure 1 represents a front view of my improved photographic testing-plate or actinometer; Fig. 2, a vertical transverse section on the line $x$ $x$, Fig. 1; and Fig. 3, a horizontal section of the same on line $c$ $c$, Fig. 1.

Similar letters of reference indicate corresponding parts.

The object of my invention is to furnish photographers an improved testing-plate, that may be readily applied to the camera, for the purpose of enabling them, in a very convenient and reliable manner, to determine with considerable certainty the quality of the chemicals employed, the quick or slow working of the lens, and to define whether the presence of "fog" or want of clearness in the picture is attributable to impurities of the chemicals, alkalinity of the bath, diffused light, over-exposure to light, or to other causes.

The invention consists of a frame with a sliding glass plate, to which are applied fixed pieces of transparent material superposed in layers of one, two, three, and more, in regular succession, to produce a greater or less obstacle to the passage of the light.

In the drawing, A represents a wooden frame, adapted to any size of camera, and attached by means of hinges and hooks or screws in such a manner that it may be placed into position for use or moved out of the way to allow the taking of the photographs in the usual manner. Into grooves of the wooden frame A is let loosely, so as to be adjustable to different heights, a glass plate, B, that is provided on one face or side with a series of fixed plates or sheets, C, of transparent material, which are arranged in such a manner that by the superposition of two, three, or more thicknesses, a greater or less resistance is produced to the passage of the light. The transparent sheets may be employed in any suitable manner, in longitudinal or lateral direction, and preferably so that the center part of the glass plate is left free, while the adjoining parts are covered with one layer of transparent material, the next adjoining sections of the plate covered by two layers or thicknesses, and so on with three or more layers to the ends or sides of the plate.

The testing-plate formed by the layers of transparent material on the sliding glass plate is set up between the lens and the sensitized plate, and the picture is then taken in the usual manner. The result is a picture which produces the light shade or shadow of the object to be photographed with the chemicals and lens, and with light of more or less the same actinic quality, intended to be used for the picture to be taken.

When the picture is developed on the plate, we find that the whole picture is visible, but that it is divided into sections of unequal intensity, being more or less distinct according as the light had to pass through one or more layers. The absence of fog at the place where the light had to pass through several layers or sheets of transparent material indicates that the chemicals are pure, that there is no diffused light, and that the nitrate bath is of proper acidity. If at that section details of the picture are clearly developed, we can conclude that the exposure has been sufficient with the lens, light, and chemicals used. The second section of the testing-plate, where the light had to pass through a less number of layers, gives more or less the same information, but indicates more clearly whether the exposure has been adapted to existing conditions or not. The next section indicates, if properly developed, what time, chemicals, &c., are to be used for the picture to be taken, while the middle or uncovered section indicates by the evident over exposure that the lens is good and rapid in action, that the chemicals are in good condition, and that the light is sufficient in actinic power to produce good pictures with rapid exposure.

The different sections of the testing-plate admit thus, in a quick and reliable manner, a conclusion as to the quality of the chemicals, lens, and light, and furnishes thereby to the photographer a cheap and simple device of adapting himself quickly and successfully to circumstances, and produce good pictures without losing the best hours of the light by a failure of the chemical apparatus or erroneous length of exposure.

Having thus described my invention, I claim as new and desire to secure by Letters Patent—

The photographic testing-plate or actinometer herein described, consisting of the frame A and the sliding glass plate B, divided into sections C by sheets or layers of transparent material, the device being adapted for attachment to a photographic camera, and for use in the manner herein set forth.

WILLIAM ALEXANDER BRICE.

Witnesses:
  CHAS. H. UPTON,
  H. A. UPTON.